US008028914B2

(12) United States Patent
Sakuma et al.

(10) Patent No.: US 8,028,914 B2
(45) Date of Patent: Oct. 4, 2011

(54) LAMINATED MATERIAL HAVING RECORDED INFORMATION THEREON, ARTICLE TO WHICH THE SAME IS AFFIXED, INFORMATION READING METHOD, AND INFORMATION READING APPARATUS

(75) Inventors: Kenichi Sakuma, Yokohama (JP); Asa Kimura, Yokohama (JP)

(73) Assignee: Shiseido Co., Ltd., Chuo-ku, Tokyo (JP)

( * ) Notice: Subject to any disclaimer, the term of this patent is extended or adjusted under 35 U.S.C. 154(b) by 538 days.

(21) Appl. No.: 12/161,019

(22) PCT Filed: Jan. 16, 2007

(86) PCT No.: PCT/JP2007/050484
§ 371 (c)(1),
(2), (4) Date: Aug. 19, 2008

(87) PCT Pub. No.: WO2007/083619
PCT Pub. Date: Jul. 26, 2007

(65) Prior Publication Data
US 2010/0147949 A1      Jun. 17, 2010

(30) Foreign Application Priority Data

Jan. 17, 2006   (JP) .................................. 2006-008583

(51) Int. Cl.
*G06K 7/10*   (2006.01)
(52) U.S. Cl. .................................. 235/462.01; 235/454
(58) Field of Classification Search .............. 235/462.01, 235/454, 462.09, 488
See application file for complete search history.

(56) References Cited

U.S. PATENT DOCUMENTS

| 5,169,707 | A | * | 12/1992 | Faykish et al. ............. 428/195.1 |
| 5,714,223 | A | * | 2/1998 | Araki et al. ...................... 428/68 |
| 5,759,671 | A | | 6/1998 | Tanaka et al. |
| 5,784,198 | A | * | 7/1998 | Nagaoka ........................ 359/534 |
| 6,846,547 | B2 | | 1/2005 | Wada et al. |
| 2005/0266448 | A1 | | 12/2005 | Hagiwara et al. |
| 2006/0051562 | A1 | | 3/2006 | Sakuma et al. |
| 2007/0048777 | A1 | | 3/2007 | Hagiwara et al. |
| 2008/0206848 | A1 | | 8/2008 | Hagiwara et al. |

FOREIGN PATENT DOCUMENTS

EP   1103914 A1   5/2001

(Continued)

OTHER PUBLICATIONS

Brief Description of Relevance for JP2004-268258, JP2003-212391 and JP2005-295877 dated Feb. 10, 2010, one page.

(Continued)

*Primary Examiner* — Daniel St.Cyr
(74) *Attorney, Agent, or Firm* — Rankin, Hill & Clark LLP

(57) ABSTRACT

A laminated material on which information is recorded is provided. The laminated material includes a microsphere fixing layer in which many transparent microspheres are arranged and buried with parts thereof exposed, a reflection layer disposed at almost the focus positions of the transparent microspheres, and a transparent resin layer provided at least partially on a surface of the microsphere fixing layer, where the transparent microspheres are exposed. The transparent resin layer shifts the focus positions of the transparent microspheres to reduce the retroreflectance of the portions where the transparent resin layer is provided. The information is recorded with the use of a difference in retroreflectance between the portions where the transparent resin layer is provided and portions where the transparent resin layer is not provided.

4 Claims, 8 Drawing Sheets

FOREIGN PATENT DOCUMENTS

| | | | |
|---|---|---|---|
| EP | 1591947 | A1 | 11/2005 |
| JP | 3-6607 | | 1/1991 |
| JP | 5-11101 | | 2/1993 |
| JP | 6-139393 | | 5/1994 |
| JP | 2719287 | | 2/1998 |
| JP | 2000-272300 | | 10/2000 |
| JP | 2001-318215 | | 11/2001 |
| JP | 2002-019253 | | 1/2002 |
| JP | 2002-19259 | | 1/2002 |
| JP | 3342015 | | 11/2002 |
| JP | 2003-212391 | | 7/2003 |
| JP | 2004-020736 | | 1/2004 |
| JP | 2004-268258 | | 9/2004 |
| JP | 2005-295877 | | 10/2005 |
| WO | 96/24867 | A1 | 8/1996 |
| WO | 2007/083619 | | 7/2007 |

OTHER PUBLICATIONS

Japanese Patent Abstract for Publication No. 2003-212391 published Jul. 30, 2003, 19 pages.

Japanese Patent Abstract Publication No. 2001-318215, published Nov. 16, 2001, 10 pages.

Japanese Patent Abstract Publication No. 2004-020736, published Jan. 22, 2004, 14 pages.

ESpace Patent Abstract for Japanese Publication No. JP3342015, published Nov. 5, 2002, One page.

Japanese Patent Abstract Publication No. 2002-019259, published Jan. 23, 2002, 6 pages.

Japanese Patent Abstract Publication No. 2000-272300, published Oct. 3, 2000, 13 pages.

ESpace Patent Abstract for Japanese Publication No. JP2004268258, published Sep. 30, 2004, One page.

ESpace Patent Abstract for Japanese Publication No. JP2719287, published Feb. 25, 1998, One page.

ESpace Patent Abstract for Japanese Publication No. JP6139393, published May 20, 1994, One page.

Extended European Search Report dated Jun. 21, 2011; Applicant: Shiseido Company Limited, Application No. 07706811.2-2210/1975650 PCT/JP2007050484, Six Pages.

* cited by examiner

LAMINATED MATERIAL HAVING RECORDED INFORMATION THEREON, ARTICLE TO WHICH THE SAME IS AFFIXED, INFORMATION READING METHOD, AND INFORMATION READING APPARATUS

RELATED APPLICATIONS

The present application is based on and claims the benefits of priority from Japanese Patent Application No. 2006-8583, filed on Jan. 17, 2006, the entire contents of which are incorporated herein by reference.

FIELD OF THE INVENTION

The present invention relates to laminated materials on which information is recorded and articles to which such laminated materials are affixed, and more particularly, to improvements in the design and information security thereof. The present invention further relates to methods and apparatuses for reading information recorded on the laminated materials.

BACKGROUND OF THE INVENTION

Information codes such as bar codes and two-dimensional codes have been printed on sticky labels and attached to components and the packages of products for production management and distribution management thereof (refer to Patent literature 1).

General methods for writing such information codes on sticky labels include a laser marking method and an ink marking method. In the ink marking method, ink having a lightness different from that of a base material is applied to a surface to write the code thereon. In the laser marking method, a surface of a sticky label is illuminated by a laser to form indentations on the surface to write the code thereon (refer to Patent literature 2).

Retroreflective materials have been used as materials for showing traffic signs, such as directional signs and regulatory signs, for traffic-accident preventive measures, and in clothing for night workers at roadworks, police officers, and fire fighters. Retroreflective materials have also been used for clothing, shoes, and bags for the same purpose while jogging and walking at night, and have been used recently for the purpose of enhancing fashionability. Since it is difficult to imitate retroreflective materials when special materials are used or when the material composition and manufacturing processes are strictly controlled, retroreflective materials are affixed to genuine articles in many cases to distinguish them from forgeries or imitations (refer to Patent literature 3).

Products have also been proposed that combine retroreflective materials, which have a high forgery prevention effect as described above, and information codes to achieve both the distinction between genuine articles and forgeries or imitations (improvement in security) and article information management with the use of the information codes (refer to Patent literature 4).

Patent literature 1: Japanese Unexamined Patent Application Publication No. 2002-19253
Patent literature 2: Japanese Patent No. 2719287
Patent literature 3: Japanese Unexamined Patent Application Publication No. 2000-272300
Patent literature 4: Japanese Unexamined Patent Application Publication No. 2004-268258

DISCLOSURE OF THE INVENTION

Problem to be Solved by the Invention

Since conventional information codes are generally printed by the ink marking method, when a sticky label on which an information code is printed is attached to a product, the design of the product deteriorates significantly. This is because the ink marking method requires a lightness difference between a base material and the ink (black and white is the easiest to read combination), and colors which can be used for the base material and the ink are highly restricted. In addition, since the information code can be visually observed easily, there is a security problem.

To keep the design from deteriorating, an indented-and-nonindented code is printed on a transparent film with the use of the laser marking method and the transparent film is attached to a product to show the information code without detracting from the design of the product. However, an indented-and-nonindented code made by the laser marking method does not generate a sufficient lightness difference (contrast) between indented portions and nonindented portions on the transparent film. Therefore, it may be impossible to read the code in automatic code recognition using a CCD camera, or some reading errors may occur. To solve this problem, for example, patent literature 2, has proposed a recognition method in which a surface where an indented-and-nonindented code is formed is illuminated with light at a predetermined angle, and reflected light obtained from edges is received. This method, however, has some disadvantages: namely, the reading conditions should be specified in detail because the light illumination angle and the position of a light-receiving section are restricted, the apparatus structure becomes complicated, and the apparatus becomes expensive. The method also has a disadvantage in that information code printing in the laser marking method is costly.

When retroreflective materials and engraved information codes are combined, as described in patent literature 4, transparent material layers need to be disposed at outer surfaces in order to have layers where information can be engraved. Therefore, the types of usable retroreflective materials are limited to closed-type retroreflective materials. The present invention has been made in view of the above-described problems. Accordingly, it is an object of the present invention to provide a laminated material having recorded information thereon which is superior in design flexibility and security and can be manufactured at a low cost.

Means to Solve the Problem

To achieve the foregoing object, the present invention provides a laminated material having recorded information thereon. The laminated material includes a microsphere fixing layer in which many transparent microspheres are arranged and buried with parts thereof exposed, a reflection layer disposed at an opposite side of a surface where the transparent microspheres are exposed and reflecting light transmitted through the transparent microspheres, and a transparent resin layer provided at least partially on the surface of the microsphere fixing layer, where the transparent microspheres are exposed. The reflection layer is disposed at almost the focus positions of the transparent microspheres so as to retroreflect at least a part of light incident on the transparent microspheres, in a direction towards almost light source of the incident light. Since the transparent resin layer covers exposure surfaces of the transparent microspheres, the transparent resin layer shifts the focus positions of the transparent microspheres from the position of the reflection layer, thus reducing the retroreflectance. Information is recorded with the use of a difference in retroreflectance between portions where the transparent resin layer is provided and portions where the transparent resin layer is not provided.

It is preferred in the laminated material that the transparent resin layer have a transmittance of 80% or more with respect to light in a visible light range (wavelengths of 400 nm to 700 nm).

It is preferred in the laminated material that the information recorded by the transparent resin layer be a bar code or a two-dimensional code.

The laminated material can be suitably affixed to articles.

In an information reading method of the present invention, light is emitted to the laminated material, and the information recorded on the laminated material is read from light retroreflected from the laminated material.

An information reading apparatus of the present invention includes a light source; a half mirror for dividing light emitted by the light source into two light beams and for emitting one of the two light beams toward the laminated material; light detecting means for receiving light retroreflected from the laminated material through the half mirror; and analyzing means for analyzing information recorded on the laminated material according to a detection signal sent from the light detecting means. The light detecting means is disposed on the opposite side of the half mirror from the side where the light source is disposed.

Effect of the Invention

According to a laminated material of the present invention having recorded information thereon, a transparent resin layer is provided at least partially on a surface where transparent microspheres are exposed; the transparent resin layer provided shifts the focus positions of transparent microspheres which the transparent resin layer covers; retroreflectance is made different between portions where the transparent resin layer is provided and portions where the transparent resin layer is not provided; and the information is recorded with the use of a difference in retroreflectance. Therefore, the laminated material provides high security without impairing the design.

DESCRIPTION OF REFERENCE NUMBERS

Figure 1:
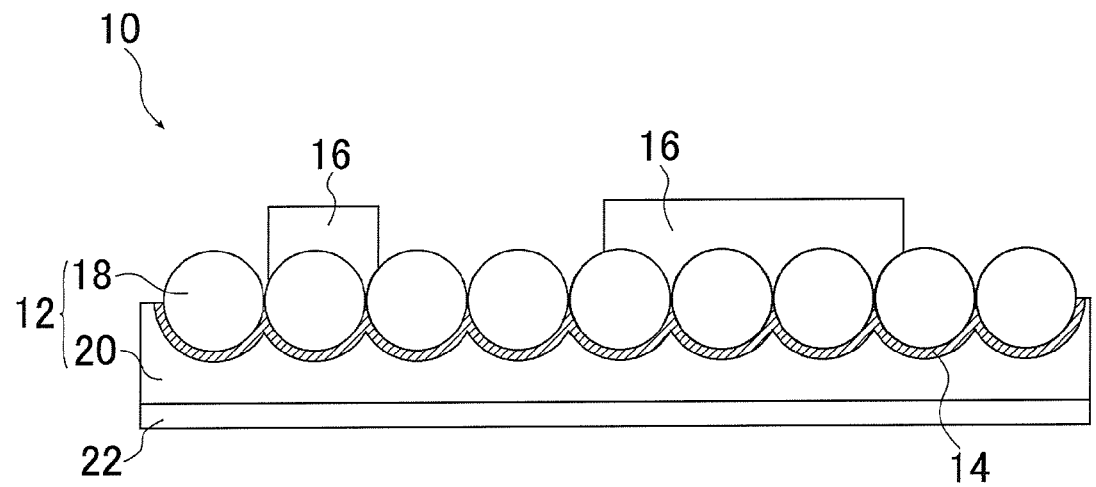
FIG. 1 is a view showing an example laminated material on which information is recorded, according to an embodiment of the present invention.

10: A laminated material having recorded information
12: A microsphere fixing layer
14: A reflection layer
16: A transparent layer
18: A transparent microsphere
20: A fixing resin layer

BEST MODE FOR CARRYING OUT THE INVENTION

Preferred embodiments will be described below with reference to the drawings.

Figure 2:
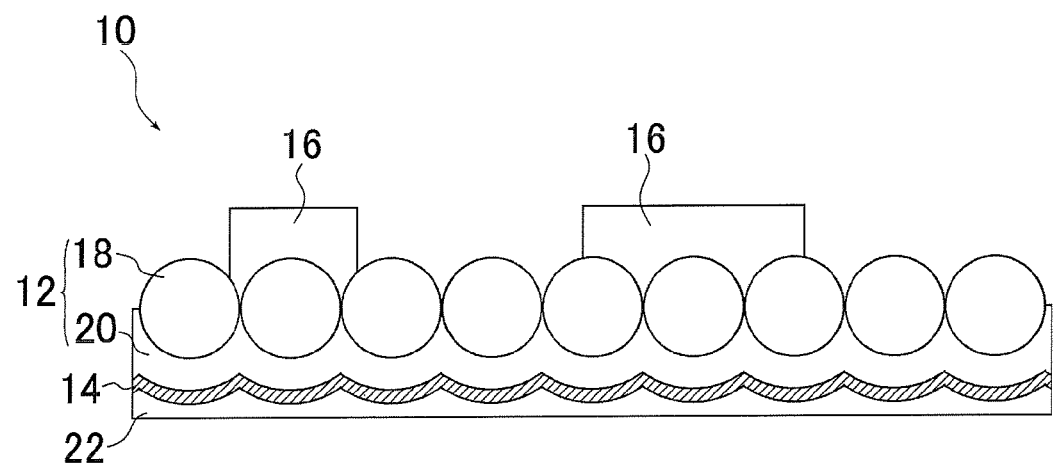
FIG. 2 is a view showing another example laminated material on which information is recorded, according to another embodiment of the present invention.

FIG. 1 and FIG. 2 are cross-sectional views of laminated materials 10 having recorded information thereon according to an embodiment of the present invention. Each of the laminated materials 10 includes a microsphere fixing layer 12, a reflection layer 14, and a transparent resin layer 16.

The microsphere fixing layer 12 is formed of many transparent microspheres 18 and a fixing resin layer 20 for fixing the microspheres 18 in an array. The transparent microspheres 18 are fixed with substantially half of their bodies buried in the fixing resin layer 20. Substantially the lower halves of the transparent microspheres 18 are buried, and substantially the upper halves are exposed to the outside (air). The microsphere fixing layer 12 has the same structure as a conventional open-type retroreflective material (used with parts of transparent microspheres being exposed to the outside). For example, the transparent microspheres 18 are glass beads having a diameter of 30 to 80 μm and a refractive index of about 1.9 to 2.2. The fixing resin layer 20 is made from acrylic resin, urethane resin, or silicone resin, for example. To increase the strength of the resin fixing layer 20, a cross-linker may be added to the resin.

The reflection layer 14 is provided at an opposite side of the surface where the microspheres 18 are exposed to the air. In other words, the reflection layer 14 may be provided directly on the bottom surface of the microspheres 18, where they are buried in the fixing resin layer 20, as shown in FIG. 1, or it may be provided below the fixing resin layer 20 (at a side opposite to the microspheres 18 with respect to the fixing resin layer 20), as shown in FIG. 2. The reflection layer 14 is disposed at almost the focus positions of the microspheres 18 (at almost the surface of the microspheres 18 in FIG. 1 and at the outside of the microspheres 18 in FIG. 2); the focus positions are determined by the refractive index of the microspheres 18 (and the fixing resin layer 20). The reflection layer 14 is provided such that the directions of the normal lines of the reflection surface thereof face the light incident direction (such that the reflection layer 14 is disposed along the spherical surfaces of the transparent microspheres 18, as shown in FIG. 1 or FIG. 2). Since the reflection layer 14 is placed at almost the focus positions of the microspheres 18, light transmitted through the microspheres 18 and reflected from the reflection layer 14 is retroreflected in the direction towards almost light source of the incident light.

The material of the reflection layer 14 is not limited, and a known material may be used. For example, aluminum, zinc oxide, silicon dioxide, titanium oxide, indium-tin oxide, or tungsten oxide may be used (refer to Japanese Unexamined Patent Application Publication No. 2004-294668). It is preferred that, in order to color retroreflected light by using optical interference, the thickness of the reflection layer be adjusted; the reflection layer be formed of a plurality of laminated sub layers; or the reflection layer be made from a material exhibiting interference, such as titanium dioxide coated mica (refer to Japanese Patent No. 3441507 and No. 3541128, for example).

A feature of the present invention is that the transparent resin layer 16 is provided at least a part of the microsphere fixing layer 12 at the side where the transparent microspheres 18 are exposed. The transparent resin layer is substantially transparent, while still absorbing, diffusing, or reflecting visible light, and there is no special limitation. In the present embodiment, the transparent resin layer is made from a transparent resin. Since a transparent resin is used, information can be recorded with a usual printing method, allowing easy manufacturing. The transparent resin layer is not necessarily made from a transparent resin only, but may include other material.

It is preferred that the transparent resin layer be transparent so that it is difficult, in a usual illumination environment, to visually distinguish portions where the transparent resin layer 16 is provided from portions where the layer is not provided. For example, it is preferred that the transparent resin layer have the same level of transparency as the transparent microspheres, or more. More specifically, it is preferred that the transparent resin layer 16 have an optical transmittance of 80% or more for visible light having a wavelength of 450 to 700 nm.

The transparent resin may be a polystyrene resin, a polyester resin, an acrylic resin, a silicone resin, a fluororesin, a polyamide resin, a polyvinyl alcohol resin, a polyurethane resin, a polyolefin resin, a polycarbonate resin, or a polysulfone resin. The transparent resin layer may be made from a transparent resin mixed with optical diffuse powder having slight light absorbance. In that case, it is preferred that the amount of the optical diffuse powder be determined such that the powder provides sufficient transparency and it be difficult, in a usual illumination environment, to visually distinguish portions where the transparent resin layer is provided from portions where the layer is not provided.

To reduce the retroreflectance of portions where the transparent resin layer is printed, it is necessary that the transparent resin layer 16 have a different refractive index from that of air (about 1), in at least a part of the visible light range (a wavelength of 450 to 700 nm). It is preferred that the difference in refractive index between the transparent resin layer and air be 0.3 or more. When the difference in refractive index is 0.3 or more, the retroreflectance is sufficiently different between portions where the transparent resin layer is provided and portions where the layer is not provided, and information can be accurately read. Here, the refractive index of the transparent resin layer means that of the overall transparent resin layer 16.

As will be described below, transparent microspheres 18 whose exposed surfaces are covered by the transparent resin layer 16 have a different retroreflectance from transparent microspheres 18 whose exposed surfaces are not covered by the transparent resin layer 16. Since information is recorded with the use of this difference in retroreflectance, a laminated material having high security and superior design flexibility is provided.

It is preferred that information recorded by the transparent resin layer be information codes such as known two-dimensional codes and bar codes. In the two-dimensional codes, data is encoded in binary and recorded two-dimensionally. In the bar codes, data is encoded in binary and recorded in one dimension.

In the laminated material of the present embodiment, an adhesive layer 22 is provided to affix the laminated material to an article. The adhesive used in the adhesive layer is not particularly limited, and an acryl adhesive, a urethane adhesive, or a silicone adhesive may be used. The adhesive layer 22 is not necessarily required. The laminated material may be affixed to an article by another method, such as by applying an adhesive for bonding or by hot-melt bonding with heat.

An outline structure of the present embodiment has been described above. The operation of the laminated material of the present embodiment will now be described below by referring to FIGS. 3A, 3B, 4A, and 4B. The laminated material shown in FIG. 1 will be taken as an example, but the laminated material shown in FIG. 2 can also be used.

Figure 3A:
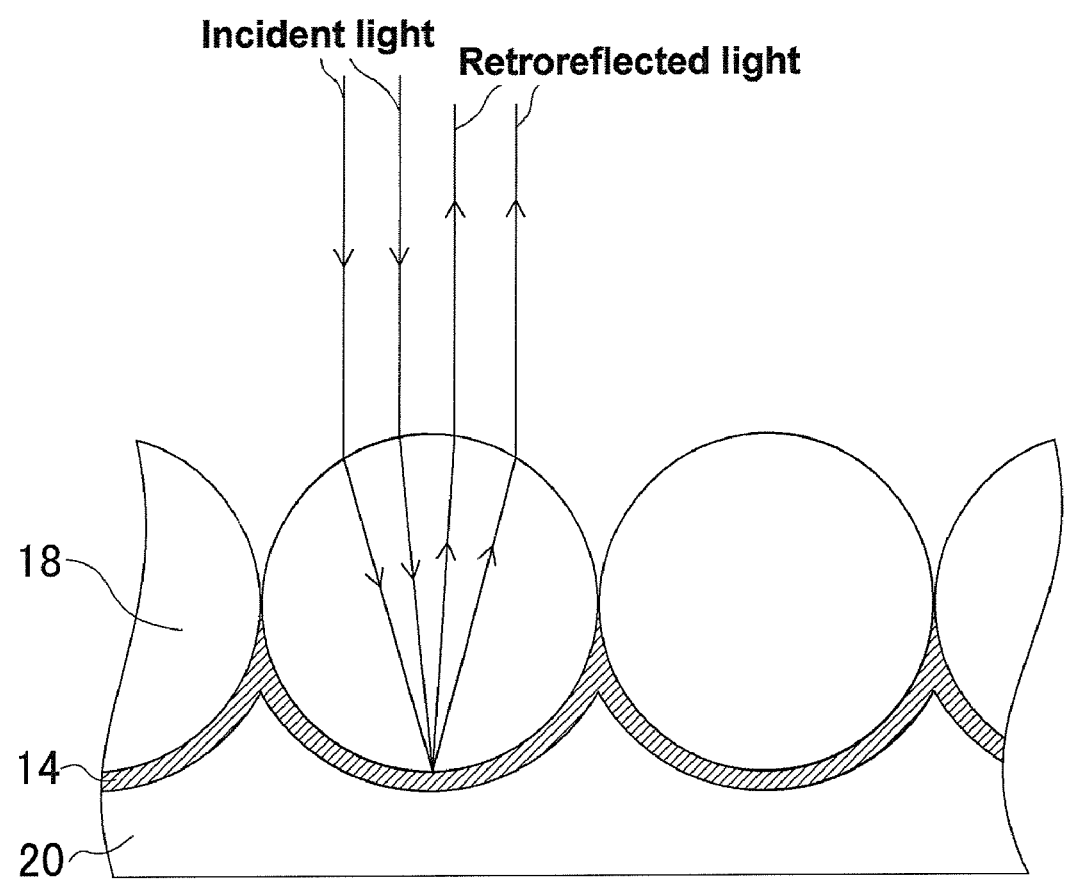
FIG. 3A is a view showing light incident on a portion where a transparent resin layer is not provided.

FIG. 3A shows a state in which light is incident on a part of the microsphere where the transparent resin layer is not provided. At least a part of the light directly incident on the microsphere 18 from the air transmits through the microsphere 18. The transmitted light is refracted at the surface where the microsphere 18 is exposed to the air (interface surface with the air) and is converged at almost the focus point of the microsphere 18. Since the reflection layer 14 is provided at almost the focus point of the microsphere 18, at least a part of the light collected by the microsphere 18 is reflected by the reflection layer 14, transmits through again the microsphere 18, is refracted at the interface surface with the air, and returns as retroreflected light in the direction towards almost light source of the incident light. In other words, the microsphere 18 serves as a spherical lens.

Figure 3B:
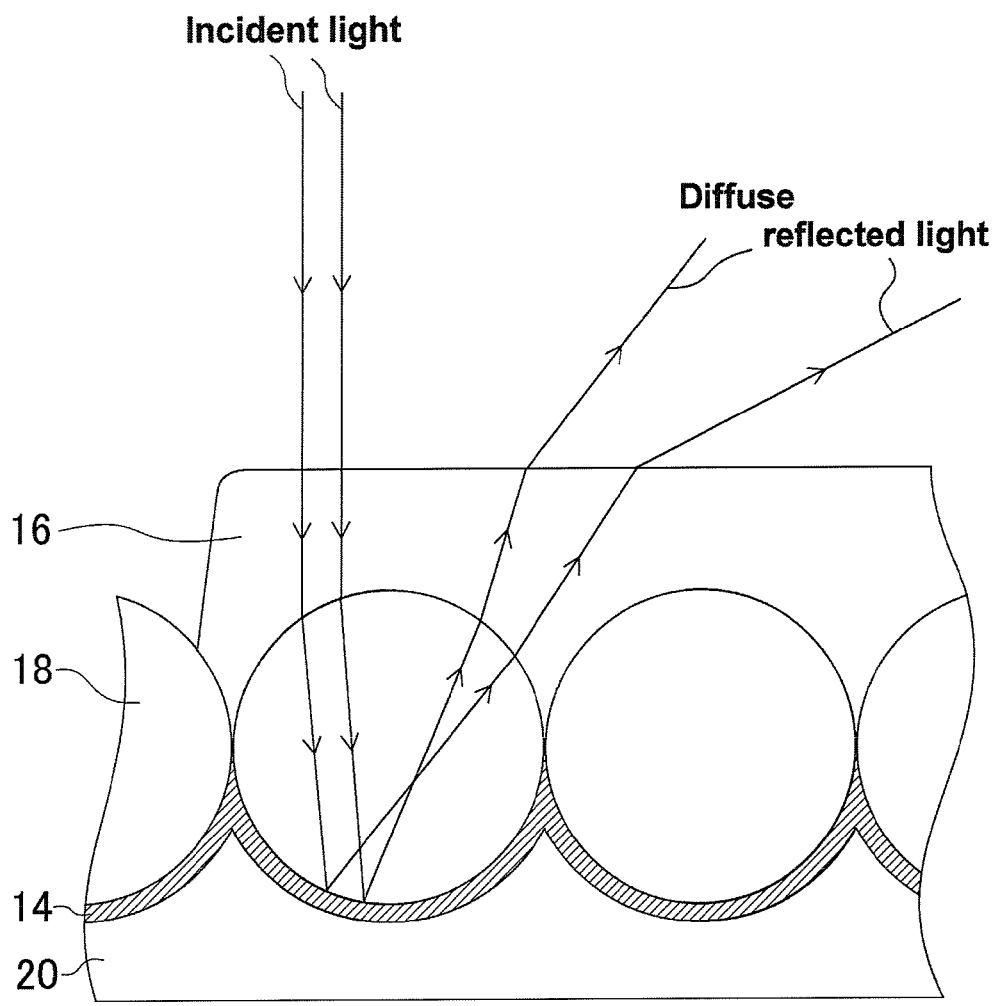
FIG. 3B is a view showing light incident on a portion where the transparent resin layer is provided.

In contrast, as shown in FIG. 3B, at least a part of the light incident on a portion of the microsphere 18 whose exposed surface is covered by the transparent resin layer 16 transmits through the transparent resin layer 16 and advances toward the microsphere 18. The refractive index of the microsphere 18 is determined such that light incident on the microsphere 18 at the surface exposed directly to the air is focused on the reflection layer 18. Since the refractive index of the transparent resin layer is different from that of the air, however, when the microsphere 18 is covered by the transparent resin layer 16, the focus position of the microsphere 18 is shifted from the position of reflection layer 14 (or the incident light is not focused on the reflection layer 14). Therefore, light transmitted through the transparent resin layer 16 and reflected by the reflection layer 14 advances in directions different from the direction towards light source of the incident light, thus serving not as retroreflected light but as diffuse reflected light. In other words, the transparent resin layer 16 causes the microsphere 18 not to function well as a spherical lens, reducing the retroreflectance.

Figure 4A:
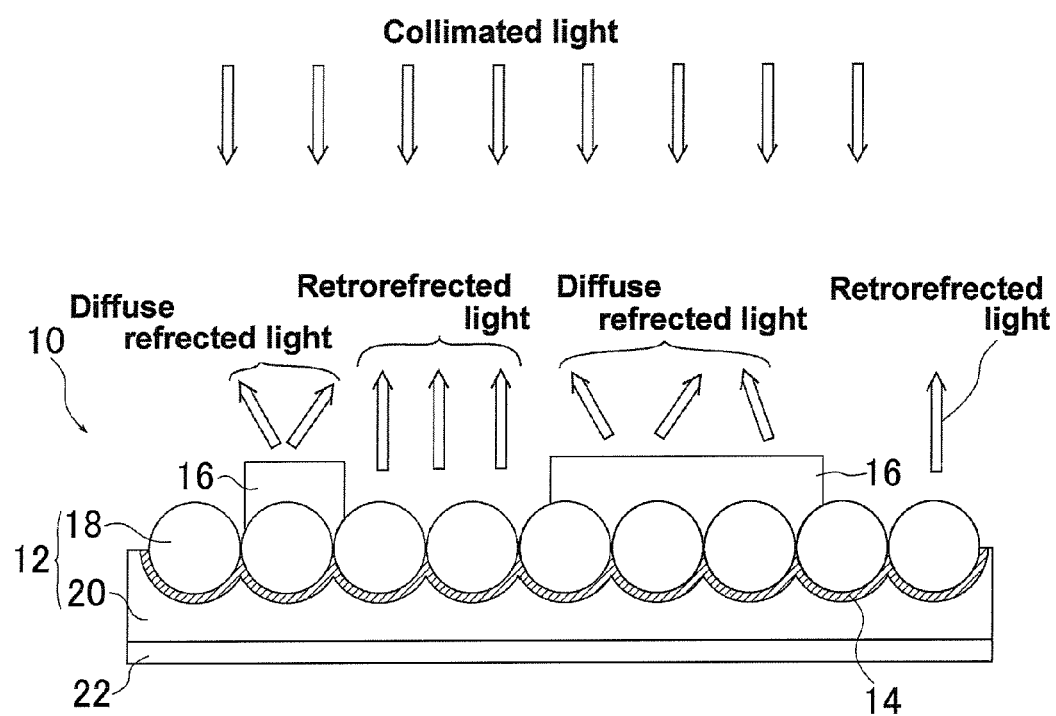
FIG. 4A is a view showing the laminated material observed under collimated light.

FIG. 4A shows a state in which light having almost the same advancing direction (hereinafter called collimated light) is incident on the laminated material 10 (the light is emitted from exactly above the laminated material 10). As described above, since portions on the microspheres 18 where the transparent resin layer 16 is provided and portions on the microspheres 18 where the transparent resin layer 16 is not provided have different retroreflectance values, as shown in FIG. 4A, the intensity of retroreflected light differs when observed from the light incident direction (from exactly above the laminated material in FIG. 4A), allowing information recorded by the transparent resin layer to be read.

Light other than the retroreflected light is mainly observed, such as light reflected from the surfaces of the transparent microspheres 18 and those of the transparent resin layer 16 when viewed from a direction away from the light incident direction. The transparent resin layer 16 and the transparent microspheres 18 are both transparent and absorb and diffuse little light. It is almost impossible to visually distinguish the portions where the transparent resin layer 16 is provided and the portions where it is not provided. Therefore, the information recorded by the transparent resin layer 16 is difficult to read. The portions where the transparent resin layer is provided diffusely reflect the incident light, and the portions where it is not provided retroreflect the incident light.

Figure 4B:
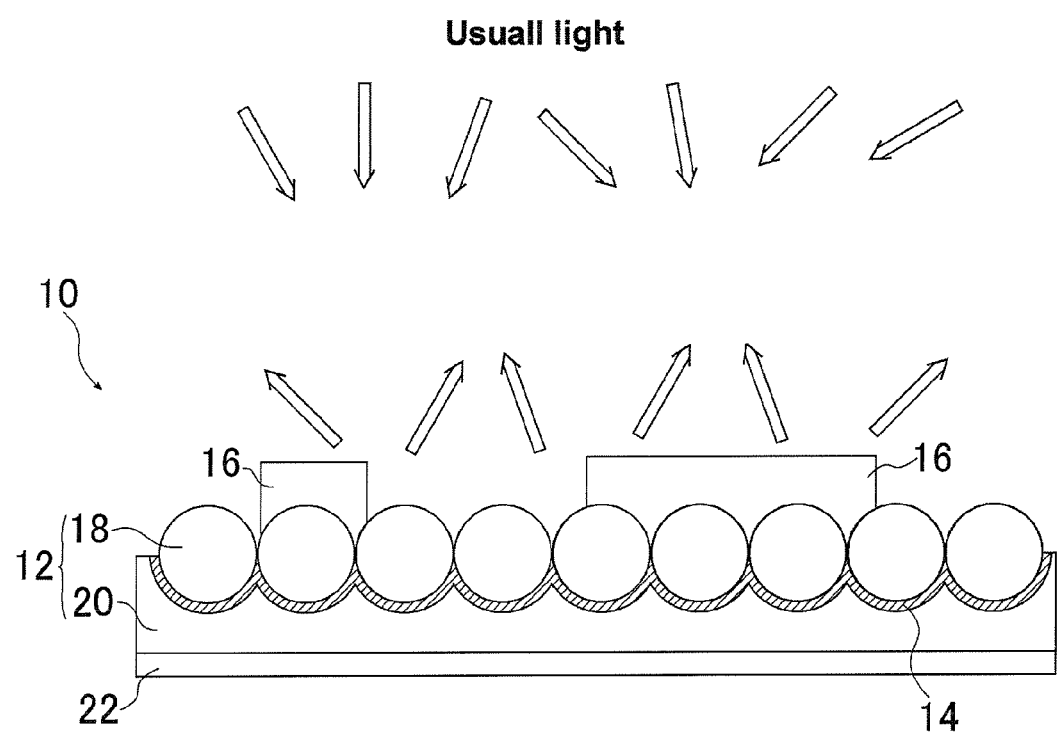
FIG. 4B is a view showing the laminated material observed under usual light.

When the illuminating light comes from different directions as sunlight or illumination from fluorescent lights (hereinafter called usual light), light is incident on the laminated material 10 from various directions, as shown in FIG. 4B. Therefore, there is no particular direction in which retroreflected light is strongly observed among the light reflected from the laminated material 10, and it is almost impossible at any observation position to visually distinguish the portions where the transparent resin layer 16 is provided from the portions where it is not provided. Therefore, the information recorded by the transparent resin layer 16 is very difficult to read under usual light.

As described above, according to the laminated material of the embodiment of the present invention, since information is recorded by the transparent resin layer, the information recorded by the transparent resin layer is difficult to visually read under usual-light illumination, as shown in FIG. 4B, and thus, does not impair the design. Security is also improved because the information can be read only with retroreflected light under collimated light illumination, as shown in FIG. 4A.

Information codes can be recorded in the laminated material by a usual printing method. Therefore, a special apparatus is not required, manufacturing is easy, and the manufacturing cost is reduced. For example, letterpress printing, intaglio printing, gravure printing, screen printing, or ink-jet printing can be used, but the printing method is not limited to these ones. The transparent resin layer can be formed not only by a paint printing method but also, for example, by a method in which sheet-shaped transparent resins are affixed.

Laminated materials of the present invention are suitable when they are affixed to the bodies or product tags of goods which are likely to be forged, such as computer software products, musical software products, and quality brand-name products (cameras, cosmetics, clothing, bags, etc.). It is useful to affix laminated materials of the present invention to goods to prevent the goods from being forged and to manage goods information.

Information Reading Method and Apparatus

An information reading method and apparatus for laminated materials according to the present invention will be described next.

In the information-code reading method of the present invention, light is emitted to a laminated material of the present invention, and retroreflected light from the laminated material is observed to read information recorded on the laminated material. It is preferred that the information reading method be used in an apparatus described below.

Figure 5:
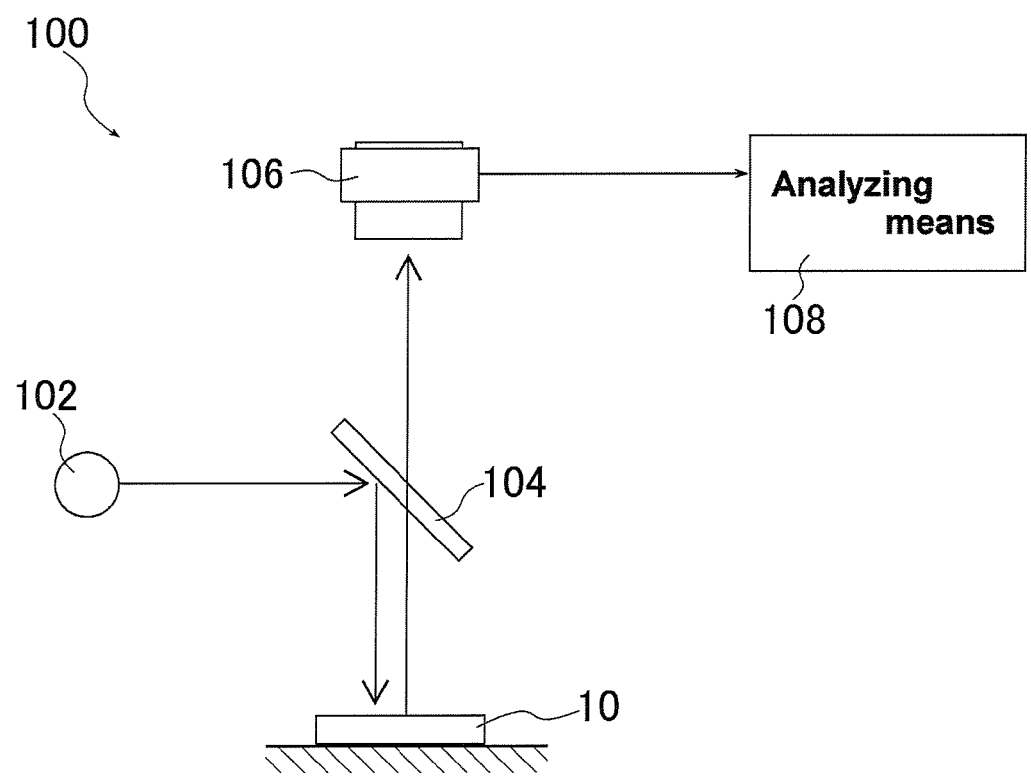
FIG. 5 is a view showing an outline structure of an information reading apparatus according to an embodiment of the present invention.

FIG. 5 shows an information reading apparatus of an embodiment of the present invention. The information reading apparatus 100 includes a light source (a white light source 102), a half mirror 104, a light detecting means (CCD camera 106), and an analyzing means 108 formed of a computer.

Light emitted from the white light source 102 travels toward the half mirror 104 and is partially reflected there toward a laminated material 10. The light traveling toward the laminated material 10 is incident thereon. Retroreflected light from the laminated material 10 travels toward the half mirror 104, partially transmits through the half mirror 104 toward the CCD camera 106, and is detected there. A signal detected by the CCD camera 106 is sent to the analyzing means 108. The analyzing means 108 analyzes information recorded on the laminated material based on the detected signal.

To read the information from the laminated material, it is necessary to observe the laminated material from a direction almost the same as the light incident direction. However, according to the apparatus shown in FIG. 5, with the use of the half mirror 104, the light source 102 and the light detecting means 106 are disposed at opposite sides of the half mirror 104, allowing them to be located without any positional interference. Therefore, the retroreflected light can be appropriately observed. The light source and the light detecting means may be switched in position.

Specific examples of the present invention will be described below, but the present invention is not limited to them.

Example 1

Transparent Resin

Screen-printing ink SG-410 made by Seiko Advance Corporation and toluene were mixed at a ratio of 90:10 to prepare a transparent paint.

Making Screen-Printing Plate

Figure 6:
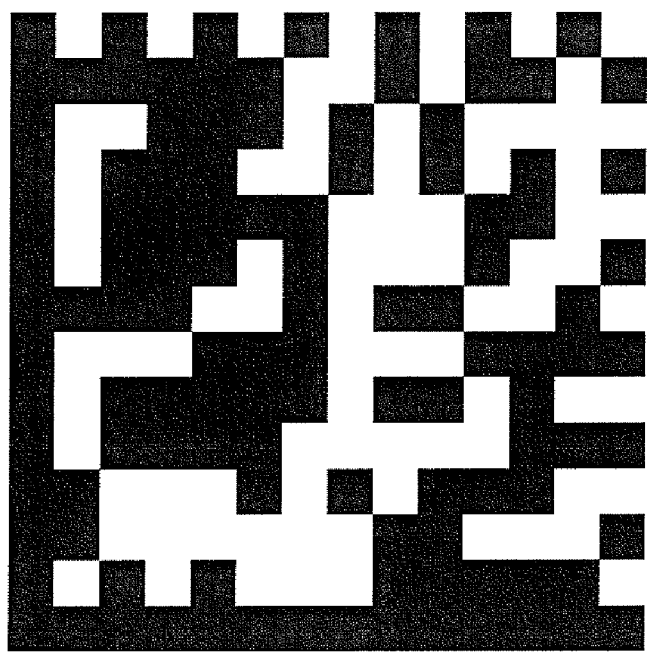
FIG. 6 shows an example two-dimensional code.

A nylon 150-mesh screen was used to make a two-dimensional Data-Matrix code screen-printing plate 10 mm square (14 by 14 cells, code information: SHISEIDO), as shown in FIG. 6.

Retroreflective Material

As a retroreflective material (microsphere fixing layer plus reflection layer), an open-type retroreflective film (LIGHT FORCE™ LFU-1200, reflection layer: Aluminum deposition, glass-bead diameter: about 40 to 50 μm, bead burying ratio: about 50%) made by Marujin Corporation was used.

Printing Method of Information-Code

The above screen-printing plate was used to print the two-dimensional code (transparent resin layer) at a thickness of about 10 μm on a surface (where the transparent microspheres were exposed) of the above retroreflective material by using a screen printing machine. The printed two-dimensional code was almost impossible to recognize visually, and thus, did not impair the design of the retroreflective material.

Analysis of Code Reading

The apparatus shown in FIG. 5 was used to read the code information from the laminated material prepared as described above. A code reader THIR-3000LP with a CCD camera (manufactured by Touken Corporation) was used as a light detection unit and an information analysis unit. As a result of code reading and analysis, "SHISEIDO" was successfully recognized.

Example 2

Figure 7:
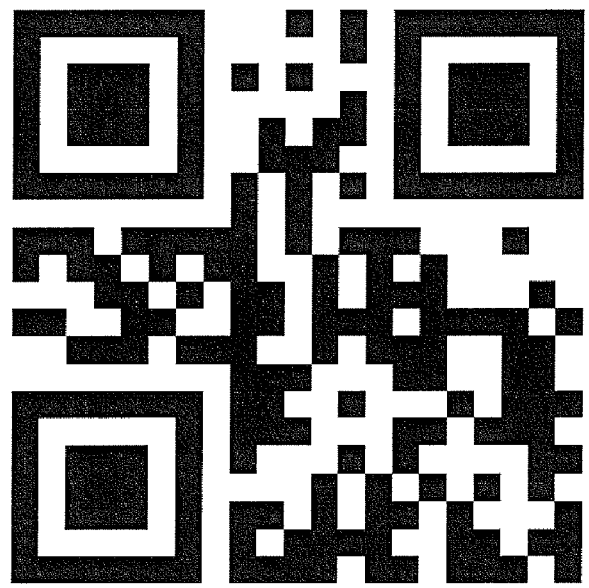
FIG. 7 shows another example two-dimensional code.

Example 2 was the same as Example 1 except that a two-dimensional QR code screen-printing plate 10 mm square (21 by 21 cells, code information: SHISEIDO) shown in FIG. 7 was used. The code information was correctly read. The printed two-dimensional code was almost impossible to recognize visually, and thus, did not impair the design of the retroreflective material.

Example 3

Figure 8:
FIG. 8 shows an example bar code.

Example 3 was the same as Example 1 except that a JAN-8 bar code screen-printing plate 15 mm wide and 18 mm long (code information: 01234565) shown in FIG. 8 was used. The code information was correctly read. The printed bar code was almost impossible to recognize visually, and thus, did not impair the design of the retroreflective material.

Example 4

Example 4 was the same as Example 1 except that an open-type retroreflective film (LIGHT FORCE™ LFU-1400, reflection layer: lamination deposition of zinc sulfide, silicon dioxide, and zinc sulfide, glass-bead diameter: about 40 to 50 µm, bead burying ratio: about 50%) made by Marujin Corporation was used as a retroreflective material. The code information was correctly read. The printed two-dimensional code was almost impossible to recognize visually, and thus, did not impair the design of the retroreflective material.

What is claimed is:

1. A laminated material having recorded information thereon including
    a microsphere fixing layer in which many transparent microspheres are arranged and buried with parts thereof exposed,
    a reflection layer disposed at an opposite side of a surface where the transparent microspheres are exposed and reflecting light transmitted through the transparent microspheres, and
    a transparent resin layer at least partially covering the surface of the microsphere fixing layer, where the transparent microspheres are exposed;
    wherein the reflection layer is disposed at almost the focus positions of the transparent microspheres so as to retroreflect at least a part of light incident on the transparent microspheres, in a direction towards almost light source of the incident light,
    wherein the part of the transparent microspheres that is not covered with the transparent resin layer is exposed to the outside,
    wherein the transparent resin layer shifts the focus positions of the transparent microspheres covered therewith from the position of the reflection layer, thus reducing the retroreflectance, and
    the information is recorded with the use of a difference in retroreflectance between the portions covered with the transparent resin layer and the portions without the transparent resin layer.

2. The laminated material according to claim 1, wherein the transparent resin layer has a transmittance of 80% or more with respect to light in a in the wavelength range of 400 nm to 700 nm.

3. The laminated material according to claim 2, wherein the information recorded by the transparent resin layer is a bar code or a two-dimensional code.

4. The laminated material according claim 1, wherein the information recorded by the transparent resin layer is a bar code or a two-dimensional code.

* * * * *